US011229138B1

(12) United States Patent
Harvey et al.

(10) Patent No.: US 11,229,138 B1
(45) Date of Patent: Jan. 18, 2022

(54) CONTROLLER MODULES

(71) Applicant: PassiveLogic, Inc., Salt Lake City, UT (US)

(72) Inventors: Troy Aaron Harvey, Brighton, UT (US); Jeremy David Fillingim, Salt Lake City, UT (US)

(73) Assignee: PassiveLogic, Inc., Salt Lake City, UT (US)

( * ) Notice: Subject to any disclaimer, the term of this patent is extended or adjusted under 35 U.S.C. 154(b) by 0 days.

(21) Appl. No.: 17/143,556

(22) Filed: Jan. 7, 2021

Related U.S. Application Data

(60) Provisional application No. 63/070,460, filed on Aug. 26, 2020.

(51) Int. Cl.
*G06F 1/16* (2006.01)
*H05K 5/00* (2006.01)
*H05K 7/00* (2006.01)
*H05K 7/14* (2006.01)

(52) U.S. Cl.
CPC ......... *H05K 7/1465* (2013.01); *H05K 7/1468* (2013.01); *H05K 7/1477* (2013.01); *H05K 7/1481* (2013.01)

(58) Field of Classification Search
CPC .. H05K 7/1465; H05K 7/1467; H05K 7/1468; H05K 7/1477; H05K 7/1481; H05K 7/1474; H05K 7/1475; H05K 7/1485; H05K 7/1487; H05K 7/1488; H05K 7/1489

See application file for complete search history.

(56) References Cited

U.S. PATENT DOCUMENTS

| 7,304,855 B1* | 12/2007 | Milligan | G11B 33/128 |
| | | | 361/724 |
| 8,628,239 B2* | 1/2014 | Merrow | G11C 29/56016 |
| | | | 374/141 |
| 10,042,730 B2* | 8/2018 | Zebian | G06F 11/0727 |
| 10,558,248 B2* | 2/2020 | Adrian | G11B 33/10 |
| 10,687,435 B2* | 6/2020 | Adrian | G11B 33/122 |
| 10,736,228 B2* | 8/2020 | Kho | H05K 7/1492 |
| 2016/0073521 A1* | 3/2016 | Marcade | H01R 43/205 |
| | | | 361/679.02 |
| 2016/0205784 A1* | 7/2016 | Kyle | H05K 3/301 |
| | | | 361/679.02 |
| 2016/0209868 A1* | 7/2016 | Hartman | G06F 1/16 |
| 2018/0123272 A1* | 5/2018 | Mundt | H01R 13/6471 |

* cited by examiner

*Primary Examiner* — Anthony M Haughton
(74) *Attorney, Agent, or Firm* — Genie Lyons

(57) ABSTRACT

A module is described which is slidably attachable to a controller. Resource wires are connected to the module through resource connectors, The module has a circuit board that can perform actions. The module can modify the function of its resource connectors. These modifications may be to meet the requirements of resources that are to be connected to the module. The module may be able to monitor voltage, current, or power, or check for faults on the wire. The results of such monitoring may be displayed on a screen associated with the controller.

20 Claims, 11 Drawing Sheets

CONTROLLER MODULES

RELATED APPLICATION

The present application hereby incorporates by reference the entirety of, and claims priority to, U.S. Provisional Patent Application Ser. No. 63/070,460 filed 26 Aug. 2020.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to modules that can be incorporated into electrical controllers. More specifically, resources wire are attached directly into resource connectors in module that plug into controllers. The modules can modify their resource connectors according to resource requirements.

BACKGROUND

Almost all building controls today are model-free. The model-free approach, while simple to implement, becomes quite difficult to manage and optimize as the complexity of the system increases. It also lacks the inherent self-knowledge to provide new approaches to programming, such as model-driven graphical programming, or to govern the interconnections between components and sub-system synergistics. Digital model based approaches to date have been limited in scope and specific to known models defined a-priori. They have thus lacked the ability to understand the connections between the resources that attach to controllers at a deep level.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

In general, a module is disclosed that comprises a circuit board disposed on the a module frame. A plurality of resource connectors are mounted on the frame, these resource connectors are configured to attach a resource wire. The resource wire is attached to a resource. Module connectors are mounted on the frame, and can connect their corresponding resource wire to the controller. A mounting system is provided that slidably mount the wiring module to the controller. The module also has a processor and memory on the circuit board that is can provide a number of functions to the resource connectors. Thus, when a resource needs a particular function for its connection to the controller, the module can provide that connection without further work from the user.

In some embodiments, the modules can provide voltage monitoring, current monitoring, or power monitoring for at least one resource that is attached to the module. In some embodiments, a display screen associated with the controller associated with the module can display the voltage monitoring, current monitoring, or power monitoring results.

In some embodiments, the resources that are to be installed within the controller are set up using a display screen associated with the controller. This controller may have databases of common resources that make it easy for resources to be placed.

BRIEF DESCRIPTION OF THE FIGURES

Non-limiting and non-exhaustive embodiments of the present embodiments are described with reference to the following FIGURES, wherein like reference numerals refer to like parts throughout the various views unless otherwise specified.

Figure 1:
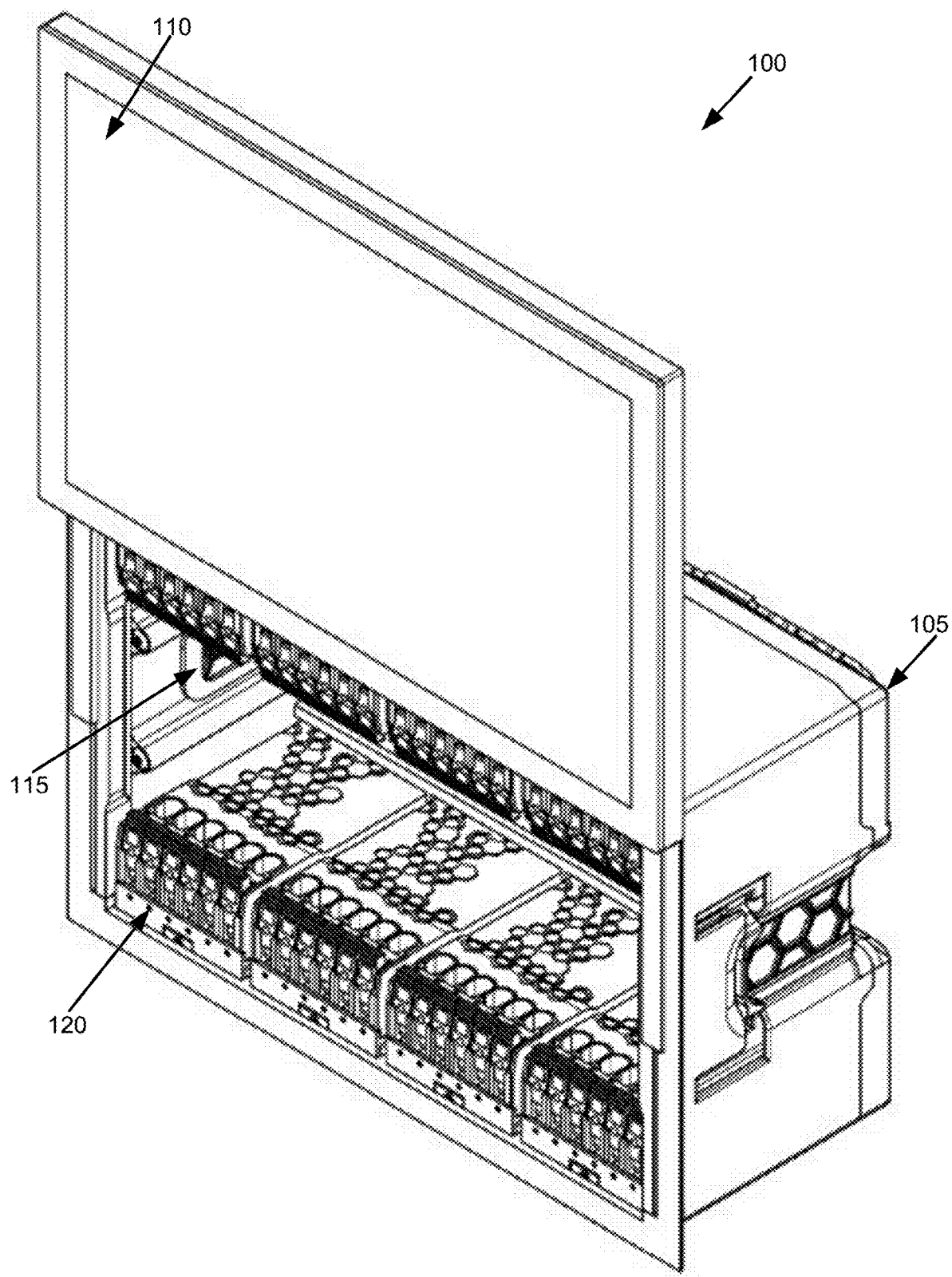
FIG. 1 is a drawing of a controller with a moveable screen and modules in conjunction with which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to modules used in electrical controllers. In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments. "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order.

In addition, it is appreciated that the figures provided herewith are for explanation purposes to persons ordinarily skilled in the art and that the drawings are not necessarily drawn to scale. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). "Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

The technical character of embodiments described herein will be apparent to one of ordinary skill in the art, and will also be apparent in several ways to a wide range of attentive readers. Some embodiments address technical activities that are rooted in computing technology, such as providing a module interface to more easily correlate devices and the controllers that they will be wired to. This allows easy changes to controllers during the construction process, as equipment is often moved around, controllers are moved, etc., without requiring days or weeks of effort to recreate the controller I/O wiring. Buildings can also be constructed more efficiently as benefits that are not apparent until the construction process can be implemented with little downtime, as equipment with different wiring requirements can be newly installed in a controller by changing modules. Further, as a building or other physical space can build its controller wiring diagram completely within a single controller (or multiple controllers networked only to each other) the entire system has a level of security unable to be reached with systems that are connected to the greater internet. In a multiple controller system, the different controllers may be self-federating, such that they can choose a master controller, can choose a different master controller if the original master has problems, can chunk computer programs to run on multiple controllers, etc. This allows scalability and flexibility as new devices, new modules, and new controllers can be added without wasting previously-deployed controller/module elements or requiring significant time or expense in modifying a previously deployed controller system. Other advantages based on the technical characteristics of the teachings will also be apparent to one of skill from the description provided.

I. Overview

In an embodiment, a controller is an interface between equipment associated with a defined space and sensors that monitor the building state. In some embodiments, it may replace building control panels in whole or in part. In an illustrative example, a controller 100 is shown that may be used with any of the disclosed embodiments. The controller 100 comprises a housing 105 with a moveable display screen 110. When the moveable screen is opened, the wiring of the controller 115 is displayed. When the screen 110 is shut, the controller wiring can no longer be seen. However, the display screen can still be used to view the contents of the controller and details about resources connected to the controller. The example 100 depicts a controller with eight modules 120 installed. The modules may be wired to one or more resources. The resources may comprise devices of many types, such as sensors or equipment. Different modules connect with a different mix of hardware, and provide a different mix of interfaces, although there may be overlap.

In some versions, one or more module connectors have built in voltage, current and power monitoring. When controlling a valve, pump, motor, or fan, the defined space may have continuous power monitoring and fault detection—automatically, partially automatically, or manually, through these modules. A connector may also have a built in multimeter and/or other hardware to ensure wires are installed correctly in real time. During a controller's self-commissioning sequence, or at other times, such as during installation, or when asked, modules may test wires for short circuits, cut wires, and proper sensor and equipment connection. Modules may be plug and play. In some embodiments, one may be able to just push a module into the controller and it automatically locks into place. In some embodiments, modules can be ejected from the controller with the push of a button.

II. Exemplary System

Figure 2:
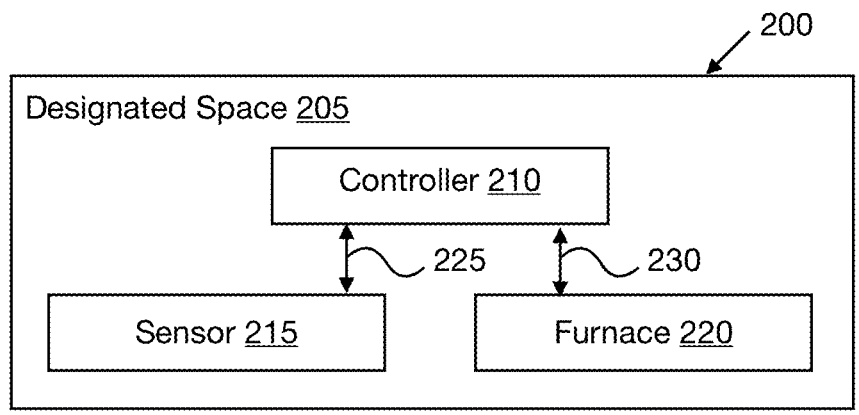
FIG. 2 is a block diagram of a designated space holding a controller, a resource, and a sensor in conjunction with which described embodiments can be implemented.

FIG. 2 at 200 depicts a very simple exemplary controller 210 system. This system comprises a controller 210, a sensor resource 215 connected 225 to controller 210, and a furnace resource 220 connected to the controller 210. In some embodiments, the sensor might not accept input from the controller 210, but the controller 210 may accept information from the sensor 215. In some embodiments, the controller may both accept and receive information 225 from the sensor 215. In this simple exemplary system, a sensor 215 may register 68°, when the desired temperature in that designated space 205 is 72°. The sensor data is fed back into the through a connection 230 to the controller 210. This may trigger the controller to turn on a furnace resource 220 by passing a message through a wire 230 that has been hardwired to the furnace resource 220, instructing it, in this case, to turn on.

In some exemplary embodiments, the controller 210 that controls the designated space 205 is within the designated space. This designated space 205 may be the controlled system the controller 210 is controlling. The controller has sufficient processing power (either alone or in connection with other controllers) and memory to run the software to control the designated space, such that no cloud computing is used. In some implementations, the designated space itself need not have wireless connectivity for the controller system to run, as the controllers, (at least some of) the equipment, and (at least some of) the sensors are connected together, either wirelessly (through the controller's own wireless network 380) or through being wired together. In some embodiments, the controller has a wired network 380 with which to speak to other parts of the controller system. In some embodiments, the controller has a wireless network 380. In some embodiments, the controller has a wired and a wireless network 380.

Figure 3:
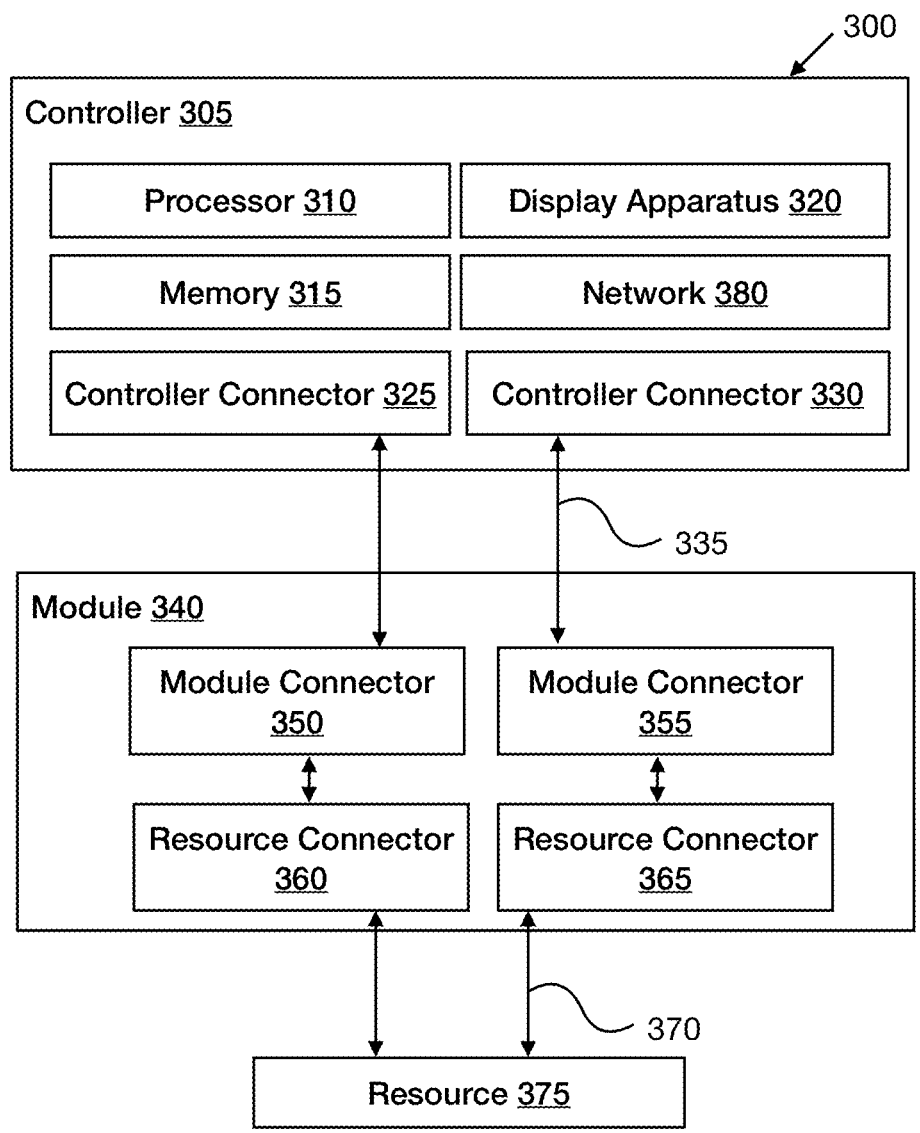
FIG. 3 is a block diagram of a controller, a module, and a resource, in conjunction with which described embodiments can be implemented.

With reference to FIG. 3, a block diagram 300 is shown of an exemplary controller—module—resource system that may be used in any of the embodiments disclosed herein. A controller 305 comprises a processor 310, memory, 315, and a display apparatus 320. The display apparatus 320 is a display that can connect to the processor 310 and memory 315 and be used to receive and display information. For example, the display apparatus may be an LED screen, a touch screen, a printer, may have a keyboard, a mouse, or other input resource. The memory 315 can be any appropriate volatile or non-volatile storage subsystem. For example, the external memory can be volatile memory, e.g., static memory cells, as in FPGAs and some CPLDs; or non-volatile memory, e.g., FLASH memory, as in some CPLDs, or in any other appropriate type of memory cell.

The controller 305 may have one or more controller connectors 325, 330 that connect 335 to a module 340 through module connectors 350, 355. This module may be called a wiring module. The module may have resource connectors 360, 365, that are directly wired 370 to a resource 375. This resource 375 may be any sort of resource, without limitation, that can be wired to a controller. For example, without limitation, resources may be HVAC resources, such as heating, cooling, and storing resources, entertainment resources, such as sound systems and TV's, lighting resources, safety resources, such as door locks, etc. The controller 305 controls the resource 360 though the module connectors 3360, 365 communicating to the controller connectors 325, 330, and vice-versa.

This allows the controller able to control the resource, such as turning a heater on, through the controller connector 325, 330 passing information through the module 740 through the module connectors 350, 355. The message is then passed to the resource connectors 360, 365 to the resource 375, such as, telling a heater to turn on. A resource may be wired 370 to one or more resource connectors 360, 365 in a module 340. In some embodiments, a resource may be wired to one or more modules. In certain embodiments, a controller may not control a specific resource at all, but infers its state from sensors, the state of other resources, and so forth.

A controller 305 may have a wireless network 380 installed so that it can communicate with controlled resources wirelessly. The controller may have wired connections between it and resources, or the controller may communicate with some resources wirelessly and be wired to other resources.

Some systems have more than one controller. In some such systems, distributed along the controllers is an in-building computer cluster. The controllers (in some embodiments) have an onboard computer and connectivity to at least some of the other controllers in a building. This connectivity may be wired (such as Ethernet) or wireless. The controllers may be self-federating in that they self-assemble into a network. At startup (or a different time), controllers vote to elect a leader. If the network is damaged, such that the current leader can no longer lead, a new leader is elected by at least some of the undamaged controllers. This provides built-in redundancy. When a computer program is to be run to help with or to control building automation (or for another reason) the leader controller determines how to divide the work load among the controllers.

III. Exemplary Module

Figure 4:
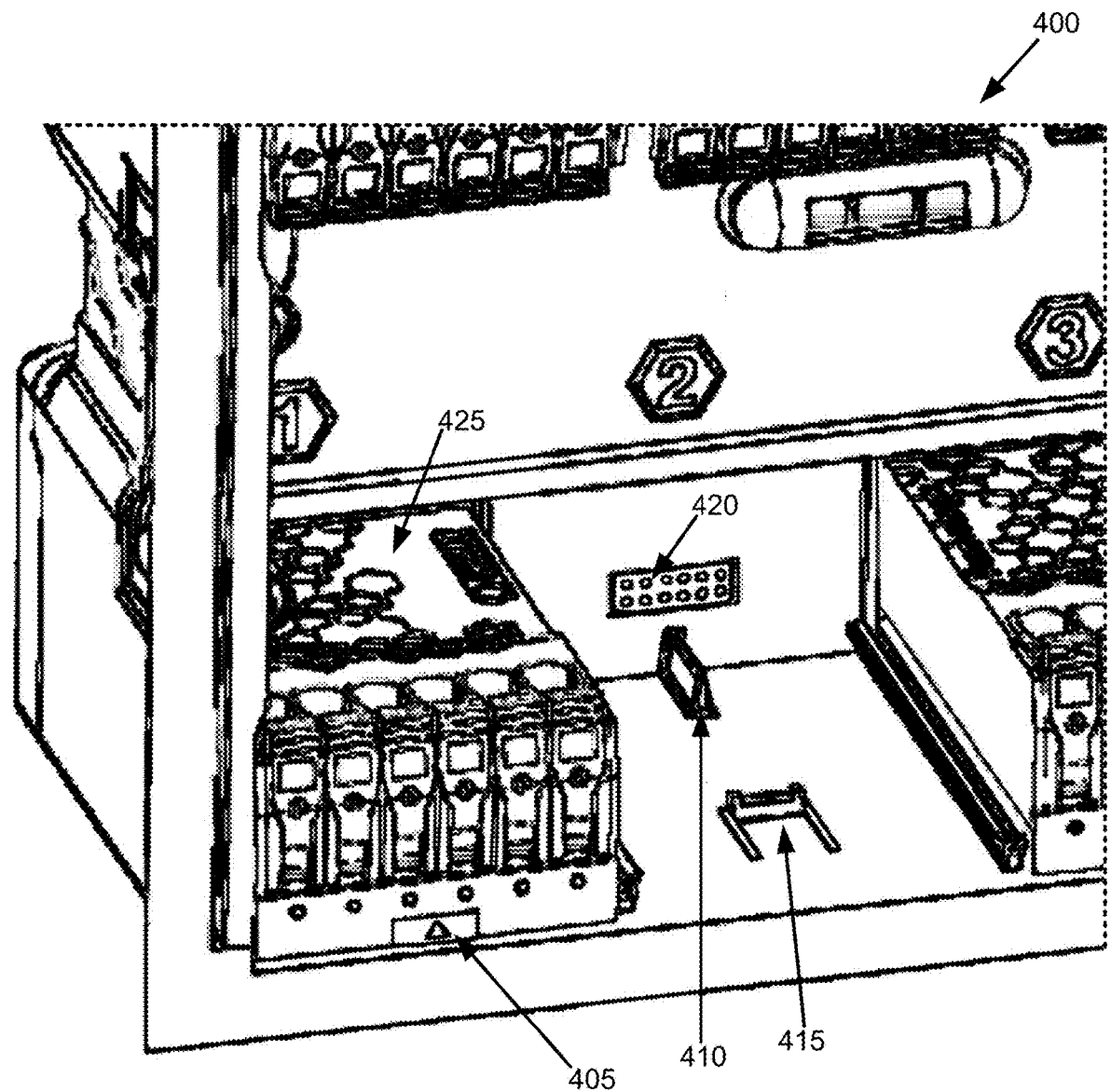
FIG. 4 depicts a controller with a spring release mechanism that attaches to the modules in conjunction with which described embodiments can be implemented.
Figure 5:
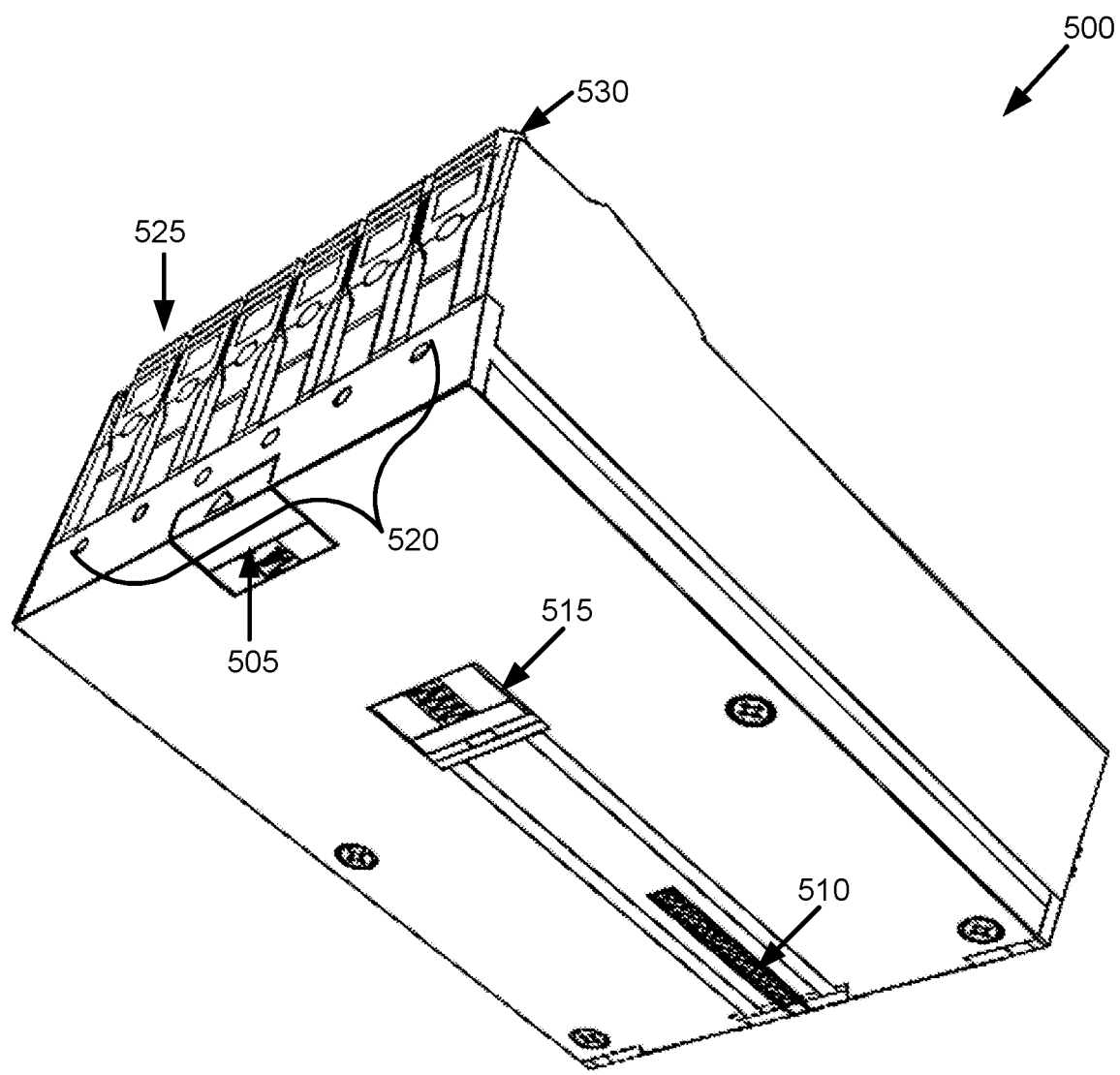
FIG. 5 depicts a bottom view of a module that attaches to the controller in conjunction with which described embodiments can be implemented.
Figure 6:
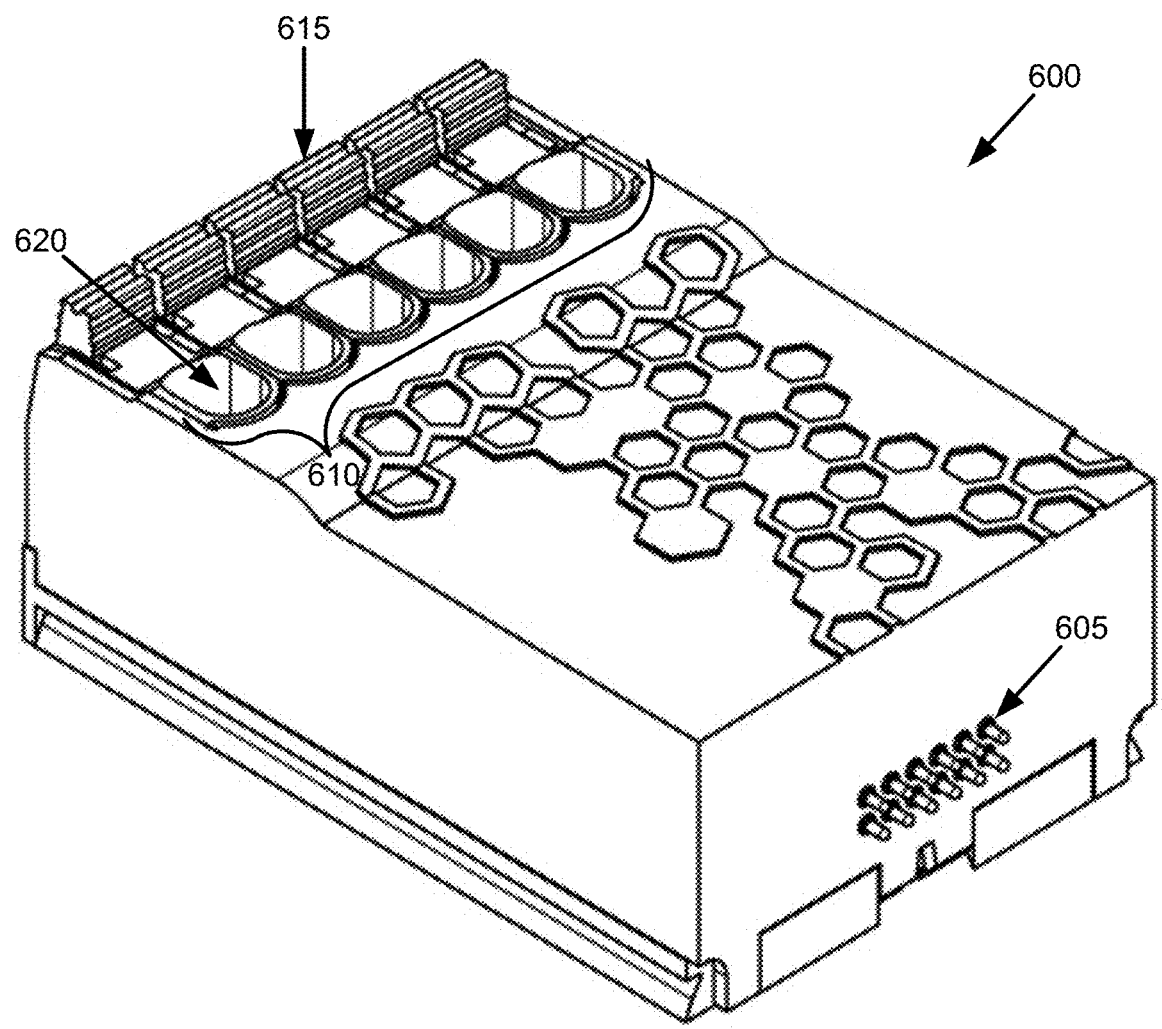
FIG. 6 depicts a side perspective view of a module in conjunction with which described embodiments can be implemented.

FIG. 4 depicts a controller 400 with a spring release mechanism that attaches to the modules. FIG. 5 depicts a bottom view of a module 500 that slidably mounts to the controller. FIG. 6 depicts a side perspective view of a module 600. When a module 425 is slid into the controller 400, there are two springs that become loaded; a front spring 515 and a back spring 510. When the module slides in, the module catches on a hook tab 415, which loads the module front spring 515 and the ejector button 505. At this time, the back spring 510 also becomes loaded by the bar 410. The bar 410 pushes the module spring 510 as the module 400, 500 is pushed into place. When the module ejector button 405, 505 is pushed, it moves the hook tab 415 down. The force from the back spring 510 pushes the module 425 out of the controller 400.

At 420, one option—pogo pins—to operably connect the controller to the module on the controller side is shown. Other connectors can be used as well. These connectors connect 335 the module 340, 500 to the controller 305, allowing messages to be passed and received between the controller 305 and a resource 375 attached to it though the module 340, 500. Twelve pins are shown on the controller connector 420, with twelve pins also on the module connector 605, but different numbers of pins can be used, without restriction. The module connector 350, 355 interfaces with the controller connector 325, 330 on the controller; these might directly connect to a controller motherboard (comprised at least in part of the processor 310 and memory 315), or might connect indirectly to the controller motherboard.

With continuing reference to FIG. 5, some corresponding structures described on the controller in FIG. 4 are shown. At 515, the module cavity structure that catches on the controller hook tab 415 is shown, as well as a back spring 510, that is loaded by the controller bar 410, and a front spring 515 that is loaded by the ejector button 405 when the ejector button is pushed into place in the controller. At 505, another view of the ejector button is shown.

Modules may be built with resource connectors 525 (also known as points), to connect wires from resources to the controller through the modules. These resource connectors 525 may be lined up side-to-side, as shown at 610. Resource connectors 525 may be arranged in a different fashion. Resource connectors 525 may be built with lever locks 530 to lock a resource wire in place that will be connected to the module 340, and through a module connector 605, to a resource. These resource connectors 360, 365 may be connected by module connectors 605, such as pogo pins, to the controller 305, which will pass information 335 from the wire connected to the resource, to the controller 305. In some embodiments, the resource connectors comprise toolless lever lock connectors that securely connect almost any wire, from 10 to 26 gauge. With continuing reference to FIG. 6, the module 600 tool-less lever lock dry contacts 610 are shown that can be incorporated into the module. A lever 615 can be pulled down. A resource wire can then be inserted 620. Pulling the lever 615 up will then pinch/secure the wire into the contact, connecting the resource wire (not shown) to the module 600. One or more of these resource connectors may have a signal associated with them.

In an illustrative embodiment, points (or resource connectors) 610 have built-in line testing. When an installer pulls a wire and inserts it in the resource connection 610, software associated with the controller, the module, or a combination of the module and the controller will test and validate whether the pulled wire corresponds to the right wire in a model of the controller, and then indicate the correct correspondence in a visible way. In an illustrative embodiment, the module has LEDs positioned by the wires (or a selection of wires, or a single LED) 520 that will indicate if the proper wire has been inserted. In an embodiment, the LED flash green if the proper wire has been pulled, or red if the wire is incorrect.

The controller wires to, and controls, external resources that will be used to change state in a physical structure associated with the controller. Examples of this include furnaces that warm the space, security systems that lock and unlock doors, humidifiers that change the humidity, air filters that clean the air, sound systems that modify the sound, etc.

Figure 7A:
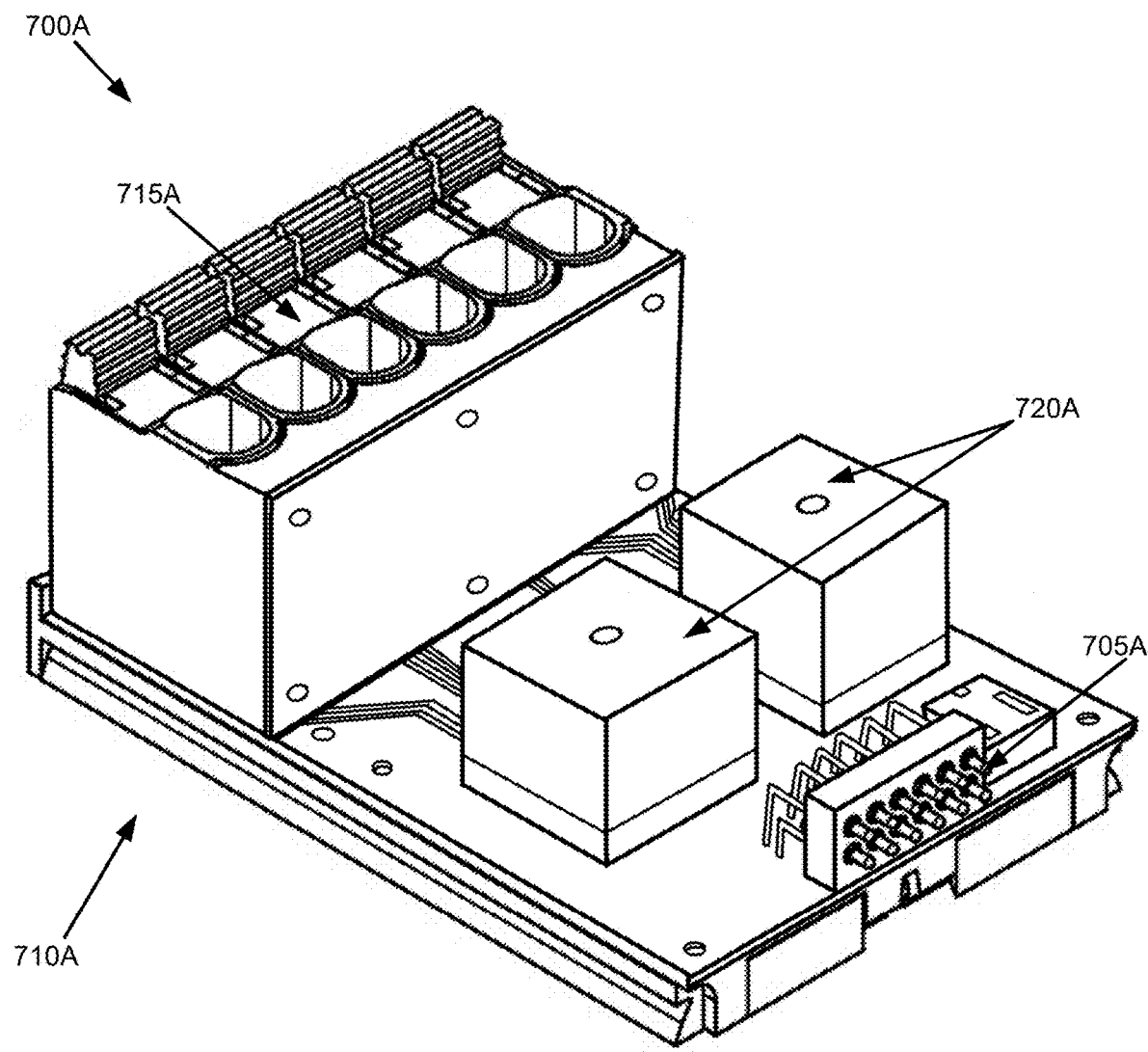
FIG. 7A depicts a side perspective view of a module with a portion of the outside cover removed in conjunction with which described embodiments can be implemented.

With reference to FIG. 7A, an embodiment of another view of the module is shown with the top surface removed Connectors 705 (e.g., pogo pin connectors) connect the module to a circuit board (which may be a controller backplane.) Module frame 710A is connected to a plurality of resource connectors 715A (six, in this case), which are connected to the module frame, and connected to the circuit board. The modules may be connected to the frame and connected to the circuit board, or may be connected directly to the circuit board. The module connectors may be connected to a circuit board with is connected to the circuit board. Two relays 720A to switch the connector (in this illustrative embodiment) are disposed on the top surface of the frame 710A in this embodiment, the relays 720A are connected to the backplane which is disposed on the frame. A variety of different options can be disposed on the top surface, depending on the requirements for a specific module.

Figure 7B:
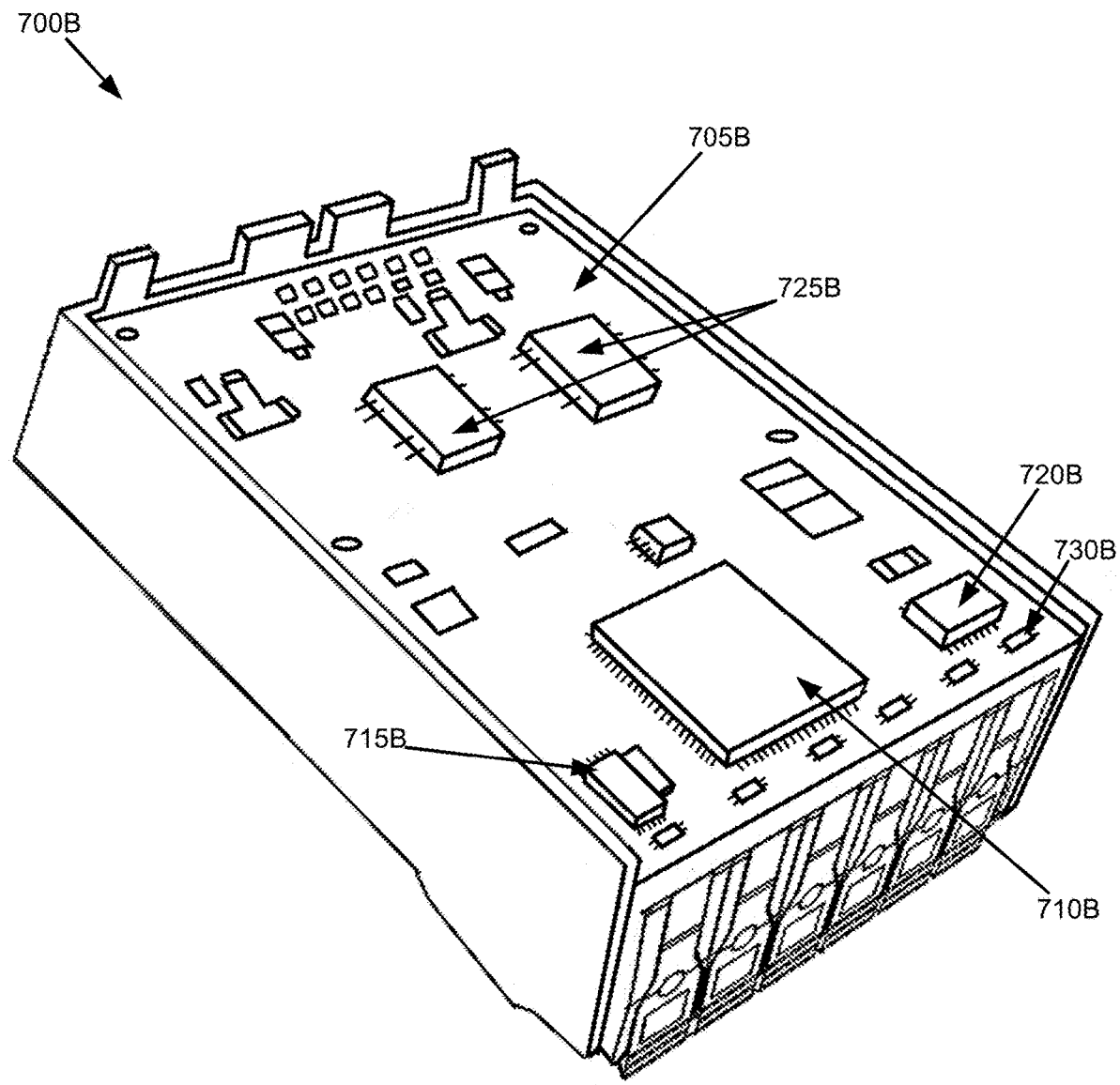
FIG. 7B depicts an underside view of a module with a portion of the outside cover removed in conjunction with which described embodiments can be implemented.

FIG. 7B depicts an illustrative embodiment underside of a module with the outer cover removed. A circuit board 705B has an integrated circuit microprocessor 710B with a processor and memory. The processor and memory are operationally able to provide a plurality of functions to the resource connectors 715A. The circuit board 705B in this module embodiment also comprises a programming header, 715B a power supply 720B, and current measurement chips 725. Indicators 730B (in this case LEDs) are disposed partially underneath the resource connectors. As can be seen with reference to FIG. 5, the indicators 520 are visible from the front of the module. Other modules with other locations of the indicators, such as on the top, on the side, or on the body of the controller are also within the scope of this disclosure.

Figure 8:
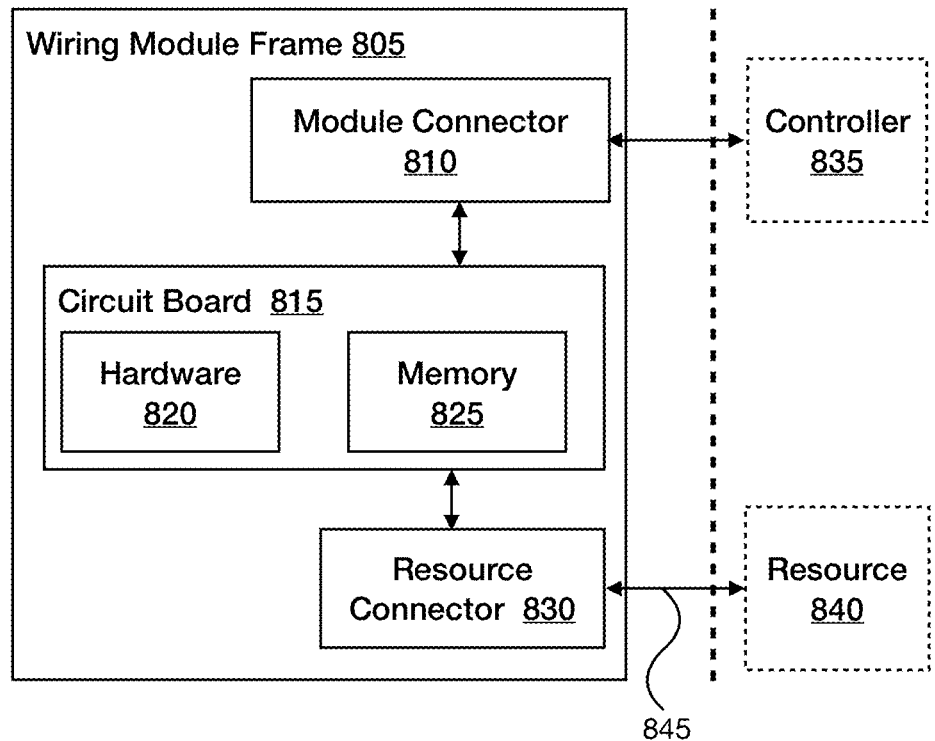
FIG. 8 is a block diagram of a wiring module frame in conjunction with which described embodiments can be implemented.

FIG. 8 shows some of the aspects of a module 340, with emphasis on the circuit board 1005 and the resource connector 360, 365 portions. In some embodiments, the module itself can make decisions and do processing using hardware 820 and memory 825 on its circuit board 815. The memory may comprise software. A controller 835, though a controller connector 325, 330 may send messages to a module connector 810. The module connector may then send those messages to its circuit board 815, which may then process the messages and make decisions. This may result in an altered signal from the signal originally sent by the controller. This altered signal may then be passed to a resource connector 830 which sends it to a resource 840 through a resource wire 845. This process may work the opposite way as well. A resource 840 sends a message through a resource connector 830 to the circuit board 815 through the resource wire 845, which may then process the message, changing the signal. The changed signal is then sent through the module connector 810 to the controller 835.

Figure 9:
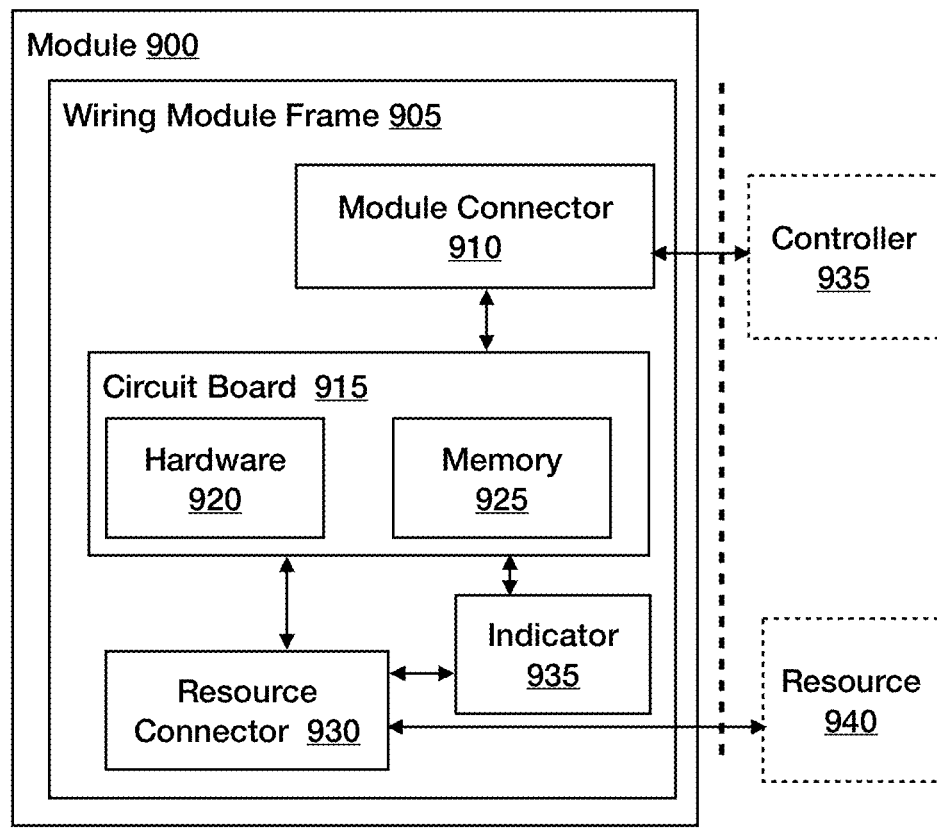
FIG. 9 is a block diagram of a wiring module frame that is an extension of FIG. 8 in conjunction with which described embodiments can be implemented.

FIG. 9 is an extension of FIG. 8 which shows a wiring module frame 905 with a module connector 910 that is operably connected to a controller 935. This connection allows messages to pass between the module and the controller. A circuit board 915 with hardware 920 and memory 925 allow the module to make decisions on its own, separate from the controller. This module embodiment has an indicator 935 that, in some embodiments, indicates if a resource 940 has been wired correctly to the controller 935. In some embodiments, the indicator 935 may show that an error has occurred with the resource wire. In some embodiments, other faults may be shown. In some embodiments, the indicator 935 may indicate that a resource is working as expected.

In the illustrated embodiment, the resource 940 is connected to the resource connector 930. The controller understands the nature of the resource 940 that is supposed to be connected to the resource connector 930 of the module 900. This understanding is through a model of the controller and resources, such as shown with reference to FIG. 10. In some embodiments, a resource 940 passes messages to the resource connector 930 that are received by the module 900 and then passed on to the controller 935, and vice versa. The controller 935, in some embodiments, has a database that tells it the resource that is supposed to be connected to a specific resource connector 930, as well as protocols and other information about the resource. Using this information, the controller 935 can determine if the correct resource has been connected. If the correct resource has been connected, the indicator 935 can be activated, or the indicator 935 can be used for a different reason. In some embodiments, the module can determine if the correct resource has been attached using its hardware 920 and software in its memory 925. In some embodiments, a combination of the controller 935 and the module circuit board 915 determines whether the correct resource has been attached.

Figure 10:
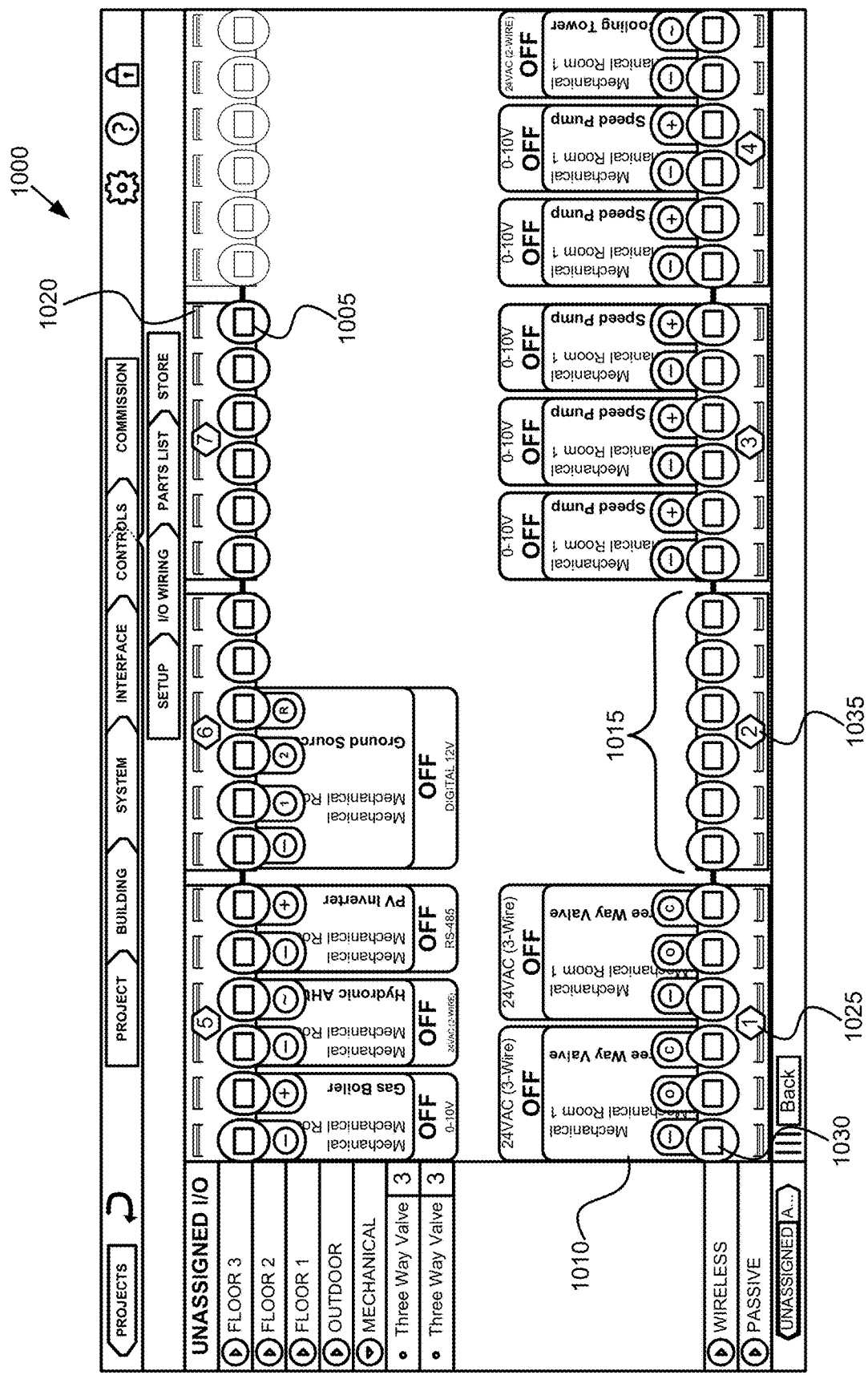
FIG. 10 is a screen shot of a controller resource display in conjunction with described embodiments can be implemented.

FIG. 10 shows an illustrative screenshot embodiment of a display that allows a user to tell the controller the expected resource layout of a controller. A controller connector 420 is shown at 1020. This controller connector is attached to a module connector 1005. Modules 1015 are indicated on the screen using grouped, numbered 1035 module connectors 1005. This module 1015 has six module connectors that will connect to resources. This controller 1000 has eight potential module locations, three of which are currently empty. Other numbers of modules in a controller, and resource connectors in a module are also with the scope of this disclosure.

The specific resources that are to be wired to the controller are shown as resource icons attached to their respective module connecters. At 1010, for example, we can see that the resource is a Three Way Valve, with a 24 VAC (3-wire) protocol. It is attached to module 1 1025. It has three wires, which are of type (–), (O), and (C) from left to right, and which are in three distinct locations on the controller. When, for example, a resource wire is wired to the lower left connection of the controller 1030, the controller knows that it is to be a wire on a Three-Way Valve, with protocol 24 VAC (3-WIRE) and the specific wire is to be of type (–). Using this information, the controller can see what information is on the wire when connected, what signals the wire accepts, and what signals the wire is expected to return, etc. When the wire is connected to the controller, the controller understands what to do to test if the correct wire has been connected to that direct controller location. If wires have been swapped on a resource (for example, the (–) and (O) wires are swapped such that the (O) wire is in the far lower left position 1030, the controller may be able to determine this, as it has the information about what signals can be expected to be sent and received on the wires. If the correct wire has been connected, then the controller may send a message to the module (through the module connecter and the circuit board) to tell an indicator 935 on the module to signal that the correct wire is in place. In some embodiments, the indicator may indicate that the wire is correct with a light, such as a green LED light, a noise, etc. In some embodiments, the indicator may indicate that the wire is incorrect with a light, such as a red LED light, a noise, etc. An illustrative embodiment is shown in FIG. 5 at 520, where there are six lights in the module, one for each of the wiring resource connector/wire connection. In some embodiments, when a wire is connected in the module (the module in the controller, the controller having been told what wire to expect) the light will light up green if the correct wire is found to be connected (by the controller, module, or a combination) or will light up red if the correct wire is not found to be connected (by the controller, module, or some combination).

This controller, e.g., may have databases of common resources stored within its memory 315; the database may be distributed amongst controllers belonging to a distributed controller system. Users may be able to add resources to the database.

In some embodiments, the controller may send a signal through the module connector to the resource connector without making any changes. Similarly, in some implementations, a resource may send a signal to the controller through the module without the module making any changes.

Figure 11:
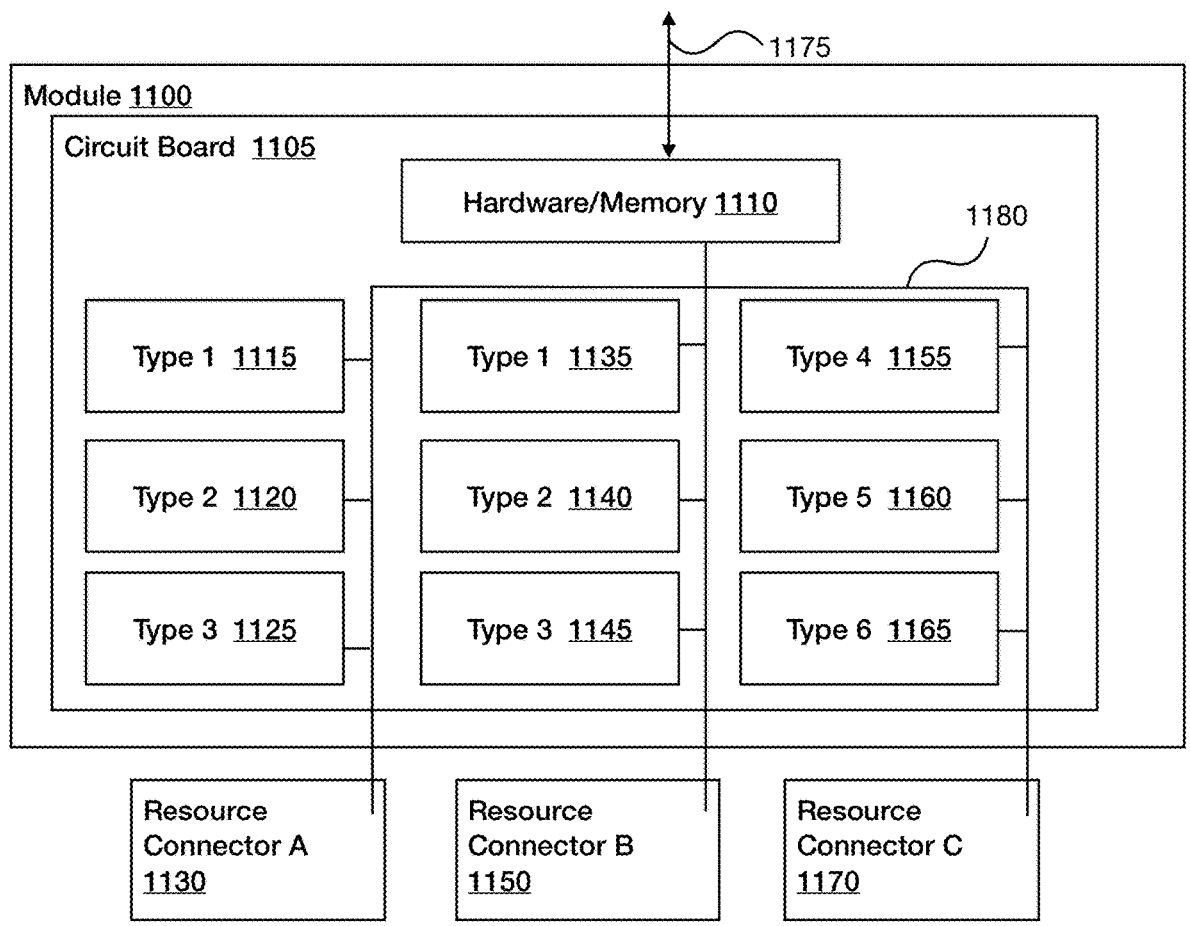
FIG. 11 is a block diagram of a module circuit board in conjunction with which described embodiments can be implemented.

FIG. 11 at 1100 shows a module that can modify its resource connectors. A resource icon placed on a display screen, e.g., such as one shown in FIG. 10, will likely have requirements for the resource connectors, e.g., (–), (O), (C) on the three-way valve 1010 connected to module 1. This module knowing what sort of resource connectors are needs, can modify its resource connectors to be of the correct type.

The module does processing and makes decisions using the hardware and memory 1110 on its circuit board 1105. For example, a controller can send a signal 1175 to a module telling it to turn a light off on a resource. The module sends the message to its circuit board 1105 which may be able to determine which of its resource connectors 1030, 1150, 1170 are associated with the resource. In some embodiments the module may be sent the information about which resource connector the message will be sent to from the controller. The module may then pass the information on to the resource. The same module may be able to handle both situations: the module determines the correct resource connector in some instances and the controller determines the correct resource connector in some instances.

In an embodiment, a module 1100 has three resource connectors, resource connector A 1130, resource connector B 1150, and resource connector C 1170. Resource connectors may be able to provide six different functions, eg., types 1 through 6. The circuit board has hardware, e.g., chips, associated with the resource connectors 1130, 1150, 1170 that can be enabled by the module receiving the appropriate signal from the associated controller, allowing the wire connectors to be of any of those types. Resource connector A 1130 has, associated with it, hardware for three types: Type 1 1115, Type 2 1120, and type 3 1125. Resource connector 2, similarly has the hardware potential to be of three types as well—Type 1 1135, Type 2 1140, and type 3 1145. Resource connector 3 has different types associated with it: Type 4 1155, Type 5 1160, and type 6 1165. The controller send a signal 1175 (or a program or another indication) to the module 1100 that resource connector A is expected to be type 1. The module 1100 may then be able to use its hardware/memory 1110 on its circuit board 1105 to send a signal 1180 telling a resource connector A to be of Type 3. The module 1100 may be able to connect wire connector 1 type 3 1125 to resource connector A, making resource connector A of type 3. In some embodiments a single resource connector may be multiple resource connector types; for example, resource connector A could be both type 2 1120 and type 3 1125.

Figure 12:
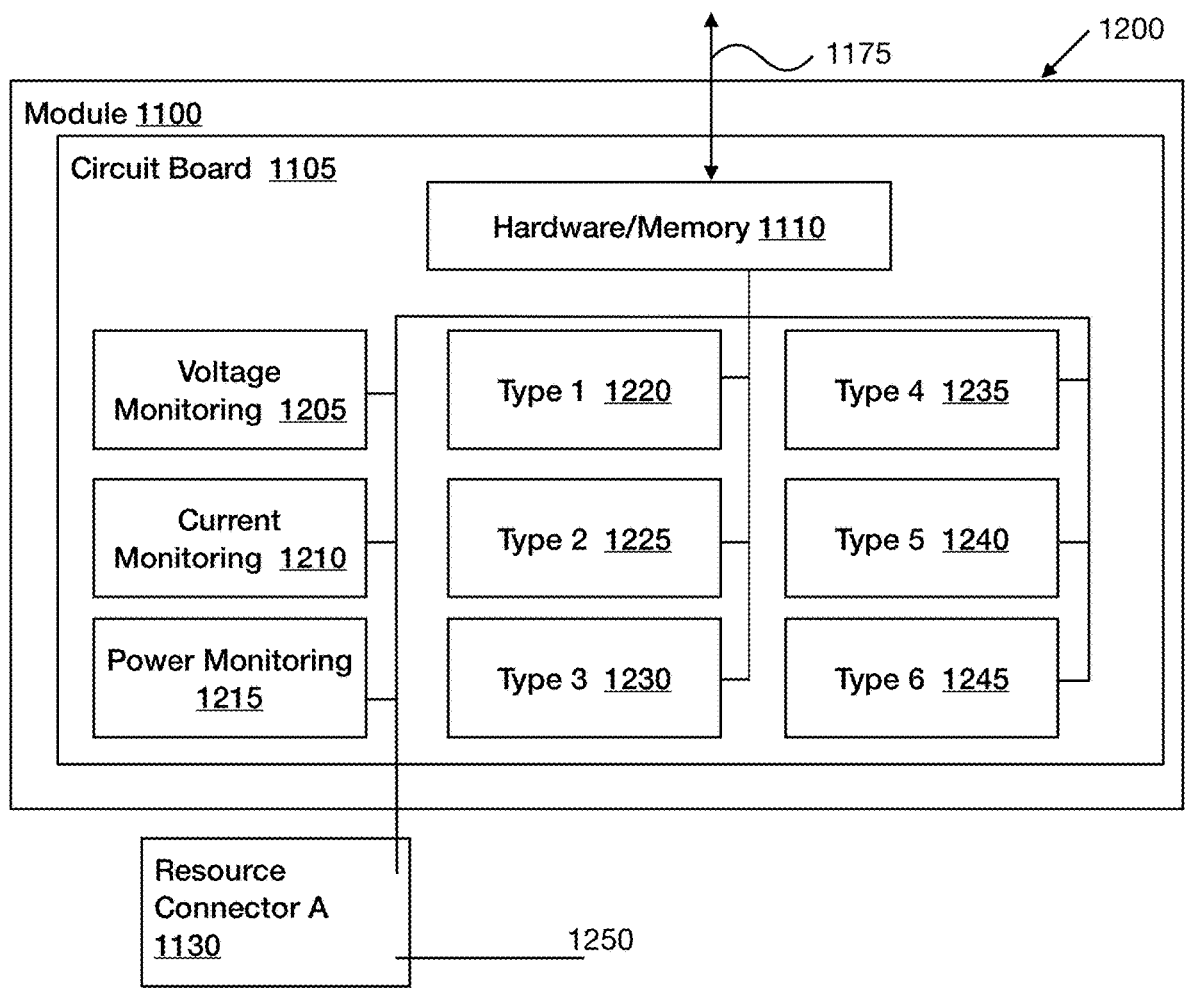
FIG. 12 is a block diagram of a module circuit board that is an extension of FIG. 11 in conjunction with which described embodiments can be implemented.

FIG. 12 at 1200 is an extension of resource connector A shown in the module 1100 of FIG. 11. In some embodiments, a module has at least one of a voltage monitoring circuit 1205, a current monitoring circuit 1210, or a power monitoring circuit 1215, controlled by at least a portion of its hardware/memory. In some embodiments, a user may be able to specify these requirements using a display apparatus 320 associated with the controller 305. In some instance, the display apparatus is a sliding display apparatus 110 attached to the controller. In some embodiments, such as the one shown, a module has a voltage monitoring circuit, a current monitoring circuit, and a power monitoring circuit. These circuits can be used to monitor the voltage, current, and/or power of a resource wire 1250 connected to resource connector A 1130. The resource wire 1250 is a wire that is a portion of the resource used to connect a given resource to a controller.

The monitoring values (e.g., voltage, current, power) can be displayed on a display apparatus 320 associated with a controller 305, that is associated with the module 1100 that is itself associated with the circuit board 1105. In the described embodiment, resource connector A has available terminal types 1-6 1220, 1225, 1230, 1235, 1240, 1245.

In some implementations, modules may test resource wires 1250 for short circuits, and/or cut wires. In some implementations, the module may use hardware/memory 1110 on its circuit board 1105 to perform these tests. In some implementations, the module may pass signals to its controller to perform these tests.

In an embodiment, images presented on the display apparatus 320 are incorporated to a user in WYSIWYG (what you see is what you get) form. WYSIWYG denotes that the representation on the screen represents, in visual format, the actual controller wiring system.

In an embodiment, the module is 2.84"×1.91"×1.11" inches. In another embodiment, the module is smaller than 3"×2"×1.25".

In some embodiments, a controller associated with the module runs computer programs that allow the resource connections to be defined. The controller then sends instructions to the module telling it which resource wire pin is expected to have which features. Each resource wire pin is associated with a resource connector 360, 365 in a module 340. In some embodiments, the resource connectors on a module may be defined to be any of a series of functions, these functions being resource connection types. These functions comprise, without limit: thermistor, RTD, 1-Wire, 0-10 V Input/Output, 0-20 mA Input/Output, 0-480 VAC Input, 24 VAC Output, or Modbus/RS485 Interface, power control blocks, SPDT relays (10A), up to 240 VDC/VAC, real-time current monitoring, real-time voltage monitoring, overcurrent protection, 120/240 VAC output-2 Amps, or 24 VAC output-2 Amp, 12/24 VDC motor drivers, PWM speed control, real-time current monitoring, real-time voltage monitoring, overcurrent protection, torque protection, and tachometer feedback. Other options are also available.

In some implementations, the following modules exist:

Multi Cell Module: A Multi Cell module may comprise the following function options:

A Ground connection (through a FET)

A 24 VAC power connection (through a Triac)

A 0-10V DC analog voltage (via a DAC)

A Strong 1-wire pullup (via a FET)

A High-range voltage divider:
- This is used when it is not clear what type of device will be plugged in to the resource connector, so the resource connector must anticipate the highest tolerated voltage (480 volt) if someone plugs in an unknown signal with unknown voltage measure. First, the system checks with high range ability to avoid adverse effects. If it sees a tiny signal, it can switch to low range, then measure the small signal. This way, the module can be safe the whole time.

A Low range voltage divider

A 4-20 mA current shunt

A 24 VAC current shunt

A DC offset injector that can measure both halves of an DC waveform

Real-time current monitoring

Real-time voltage monitoring,

A Time Domain Reflectometer.

Power Cell Module

A power cell module may have some combination of 2× power control blocks, 120/240 VAX output-2 amps, 24 VAC output-2 amps, AC motor control.

The power module may also comprise dimmable lighting, real-time current monitoring and real-time voltage monitoring.

Motor Cell Module

A motor cell module may have some combination of 2×DC motor control blocks, Up to 6 12/24 VDC high current motor drivers, can switch 2050 volt AC up to 10 amps A voltage measuring chip A current measuring chip—the current that gets consumed passes through, both module connections, detect how much voltage being used and current being used, led's too.

These modules may also comprise PWM speed control, real-time current monitoring, real-time voltage monitoring, overcurrent/torque protection, and tachometer feedback.

Relay Cell Module 2 electromechanical relays

The relays have 3 connections (normally open, common, normally closed)

The relay module may be able to measure voltage and current for the common connector on the relays.

Relay modules may also provide for real-time current monitoring, real-time voltage monitoring, and overcurrent protection.

Modules may freely mix and match from the various types of resource connection functions. The resource connection function options listed here are in no way limiting. Modules with different functions may be in the same controller.

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A wiring module for a defined space controller, comprising:
   a frame;
   A circuit board disposed on the frame;
   A plurality of resource connectors mounted on the frame, the plurality of resource connectors configured to attach a corresponding resource wire;
   A plurality of module connectors mounted on the frame, the plurality of module connectors configured to operably connect the corresponding resource wire to the defined space controller;
   a mounting system configured to slidably mount the wiring module to the defined space controller; and
   a processor and memory disposed on the circuit board that is operationally able to provide a plurality of functions to the plurality of resource connectors.

2. The wiring module of claim 1, wherein the processor and memory disposed on the circuit board is operationally able to modify information passed to a resource attached to a resource connection.

3. The wiring module of claim 1, wherein the plurality of functions comprise ac motor control, dimmable lighting, real-time current monitoring, real-time voltage monitoring, overcurrent protection, torque protection, or tachometer feedback.

4. The wiring module of claim 1 wherein at least one resource connection comprises a dry contact switch.

5. The wiring module of claim 1, wherein the plurality of functions comprises at least two of: thermistor, RTD, 1-Wire, 0-10 V Input/Output, 0-20 mA Input/Output, 0-480 VAC Input, 24 VAC Output, or Modbus/RS485 Interface.

6. The wiring module of claim 1, wherein the plurality of functions comprises at least two of: 120/240 VAC output-2 Amps, or 24 VAC output-2 Amps.

7. The wiring module of claim 1, wherein the plurality of functions comprises at least two of: claim DC Motor Control Blocks, or 2/24 VDC motor drivers.

8. The wiring module of claim 1, wherein the plurality of functions comprises at least two of: SPDT relays (10A), or Up to 240 VDC/VAC.

9. The wiring module of claim 1, wherein at least one of the plurality of connectors comprises being operationally able to provide to a resource associated with a corresponding resource wire one or more of a plurality of functions comprising: AC motor control, dimmable lighting, real-time current monitoring, real-time voltage monitoring, overcurrent protection, torque protection, or tachometer feedback.

10. The wiring module of claim 1, wherein software associated with memory on the circuit board is operationally able to provide to a resource attached to a resource connection one or more of a plurality of functions comprising: AC motor control, dimmable lighting, real-time current monitoring, real-time voltage monitoring, overcurrent protection, torque protection, or tachometer feedback.

11. The wiring module of claim 1, wherein the mounting system further comprises a cavity that is configured to catch a hook tab associated with the defined space controller.

12. The wiring module of claim 11, wherein the mounting system further comprises a spring that is operationally able to be activated by the hook tab.

13. The wiring module of claim 12, wherein the mounting system further comprises an ejector button configured to move the hook tab associated with the controller when activated, and when doing so activates the spring.

14. The wiring module of claim 1, wherein the plurality of resource connectors comprise connectors that accept wire from 10 gauge to 26 gauge.

15. The wiring module of claim 1, wherein the module is smaller than 3"×2"×1.25".

16. The wiring module of claim 1, wherein the plurality of resource connectors are operationally able to be configured by hardware on the circuit board to perform different functions.

17. A wiring module for a controller, comprising:
    a frame;
    A circuit board disposed on the frame;
    A resource connector mounted on the frame, the resource connector configured to attach a resource wire;
    A module connector mounted on the frame, the module connector configured to operably connect the resource wire to the controller, the resource operationally able to be controlled by the controller;
    a mounting system configured to mount the wiring module to the controller; and
    a processor and memory disposed on the circuit board that is operationally able to monitor resource wires for at least one of voltage, current, or power.

18. The wiring module of claim 17 wherein the wiring module is operationally coupled with the controller, the controller comprises a display apparatus, and wherein values derived from the monitoring of the resource wire is operationally able to be displayed on the display apparatus.

19. A wiring module for a designated space controller, comprising:
    a frame;
    A circuit board disposed on the frame;
    A resource connector mounted on the frame, the resource connector configured to attach a resource wire;
    A module connector mounted on the frame, the module connectors configured to operably connect the resource wire to the designated space controller, the resource operationally able to be controlled by the designated space controller; and a mounting system configured to slidably mount the wiring module to the controller, the mounting system comprising a back spring, a front spring, and an ejector button, wherein the back spring and the front spring are loaded by the ejector button when the ejector button is pushed into place in the designated space controller.

20. The wiring module of claim 19, wherein the resource connector is a tool-less lever lock dry contact connector.

\* \* \* \* \*